United States Patent Office 2,914,548
Patented Nov. 24, 1959

2,914,548

PROCESS FOR PRODUCING ARYLOXYPHENYL SILANES

Gene E. Schroll, Baton Rouge, La., assignor to Ethyl Corporation, New York, N.Y., a corporation of Delaware No Drawing. Application December 14, 1956
Serial No. 628,236

2 Claims. (Cl. 260—448.2)

This invention relates to the preparation of organic compounds of silicon and, more particularly, to the preparation of tetraorgano monosilanes.

The literature discloses several routes to tetraorgano monosilane compounds. These compounds can be prepared by the reaction of an organometallic compound with a halosilane compound. A Grignard reaction is the most frequently suggested method of preparation and gives good distribution of the organic groups on the silicon atom, but fails to produce tetraorgano monosilane compounds in high yield. Another suggested preparation is the reaction of an organic halide and a silicon halide. When an alkali metal is employed, the reaction is extremely difficult to control, and under the conditions employed, the alkali metal reacts with the halogens on the silicon, producing silicon-to-silicon bonding, or the alkali metal can attack the organic halide at the point where the halogen is attached, producing Wurtz-type carbon-to-carbon coupling instead of a carbon-to-silicon bond. These and other complicating factors can occur when the carbon-to-silicon bonding is desired. A completely satisfactory overall method for the preparation of tetraorgano monosilane compounds is conspicuously absent from the literature—specifically, a method whereby wide variations of types and combinations of organic radicals can be attached to a silicon atom, such an attachment being effected in an economical and simple manner and resulting in high yields of tetraorgano monosilane compounds.

Among the objects of the present invention is the production of tetraorgano monosilane compounds having all four valences of the silicon atom attached through carbon to monovalent organic radicals. Another object is the preparation of tetraorgano monosilane compounds having wide variations of types and combinations of organic radicals attached to a silicon atom. A further object is the preparation of these compounds by simple methods utilizing economical alkali metals. An additional object is the preparation of tetraorgano monosilane compounds in high yields heretofore unobtainable. Other objects shall appear hereinafter.

These and other objects are accomplished by reacting a halocyclomatic compound, containing 5 to 14 nuclear atoms, and an organo halosilane by means of a finely dispersed alkali metal having an atomic weight greater than 7. The halocyclomatic compound can be represented by the formula RX, wherein R is a monovalent cyclomatic radical containing 5 to 14 nuclear atoms and X is a halogen, preferably, chlorine, bromine, or iodine. Likewise, the organo halosilane compounds can be represented by the formula $R'_n SiX'_{(4-n)}$, wherein R' is an organic radical, X' is a halogen, specifically, chlorine, bromine, iodine or fluorine, and $n$ is an integer from 1 to 3 inclusive. Additionally, it is to be understood that when $n$ is greater than 1 the group $R'_n$ can represent a mixture of several organo radicals as defined hereinafter. Thus, tetraorgano monosilanes of the type $R'_n SiR_{(4-n)}$, wherein all four valences of the silicon atom are attached through carbon to R and R' are produced.

In a preferred embodiment of this invention cyclomatic compounds of the type RX, wherein R is an aryloxy phenyl radical, and X is as defined hereinbefore, are condensed with a compound of the type $R'_n SiX'_{(4-n)}$, R' being an aliphatic radical, and X' and $n$ are as previously defined. The preferred condensation agent is finely dispersed sodium having a particle size not greater than 100 microns and preferably not greater than 25 microns. Further, it has been discovered that the alkali metal condensation agent can be dispersed in a hydrocarbon medium, having an atmospheric boiling point between about 0 and 200° C. and, preferably, between about 20 to 120° C.

While the order in which the reactants are combined can be varied within certain limits, it has been found that superior results are obtained when the cyclomatic halide and the organo halosilane are pre-mixed before adding them to the alkali metal dispersion.

To obtain the benefits of this invention, the molar ratio of alkali metal to RX to $R'_n SiX'_{(4-n)}$ varies within the limits of 4—2:2—1:1 for each carbon:silicon bond formed. While, in general, it is preferred to employ approximately stoichiometric proportions of the reactants, in some cases, particularly when the compound RX is susceptible to undesirable side reactions, it is preferred to use an excess of the compound RX and also a corresponding excess of the alkali metal, at the same time maintaining the ratio of excess RX to excess alkali metal at approximately the ratio, and within the limits, described above to avoid such undesirable side reactions.

The following example more clearly illustrates the process of this invention and also points out that tetraorgano monosilanes are prepared in higher yields and, as an added advantage, in shorter reaction times than taught in the art. In the examples which follow, unless otherwise specified, all parts and percentages are by weight.

*Example I*

To a reaction vessel provided with means for agitation, heating, continuous addition of reactants and refluxing was added 21 parts of sodium as a 20% dispersion in equal parts of 2,2,5-trimethylhexane and benzene. This dispersion had a particle size range of 8 to 15 microns and contained as a dispersing agent 0.75% of oleic acid, based upon the weight of sodium. A continuous stream of nitrogen was swept through the system. While agitating this dispersion at a temperature of 30 to 40° C., a mixture of 100 parts of p-bromophenyl phenyl ether and 38 parts of n-dodecyl trichlorosilane was added over a period of one hour. During the course of this addition the reaction mixture became increasingly viscous. Therefore, to facilitate stirring at the end of the addition period an additional 90 parts of benzene was added and agitation was continued for an additional period of one hour. At the end of this period the dark blue mixture was heated at the atmospheric reflux temperature for a period of four hours. The temperature of the reaction mixture was reduced to 25° C. and the mixture was diluted while agitating with 50 parts of water followed by addition of sufficient 4 N-hydrochloric acid to acidify the mixture. The entire reaction product was then filtered through a layer of diatomaceous earth whereupon the filtrate separated into two layers. The organic layer containing the product was treated with water until the water extracts were neutral. The organic layer was then separated by decantation, dried over anhydrous calcium sulfate and the solvent was removed by distillation. The residue containing the product, tris-(p-phenoxyphenyl)-n-dodecylsilane, was distilled so as to remove a forerun of 8.2 parts at temperature of below 360° C. at a pressure of 0.3 millimeter of mercury. This forerun was followed by a cut containing 60.5 parts of product corresponding to a 69% yield of tris-(p-phenoxyphenyl)-n-dodecylsilane, distilling at a temperature of 365 to 395° C. at 0.3 millimeter and having a refractive index, $n_D^{25}$ 1.5946.

By carrying out the addition of reagents in Example I at a temperature of 100° C. over two hours rather than at 30 to 40° C. over one hour, a 32.4% yield of the product tris-(p-phenoxyphenyl)-n-dodecylsilane was obtained by utilizing a mixture of 30.4 parts of n-dodecyl trichlorosilane and 100 parts of p-bromophenyl phenyl ether. This mixture was added to a reaction vessel containing 21 parts of sodium as a 20% dispersion in isooctane. The dispersion, in this case, had a particle size of 5 to 12 microns. The separation of the product from the reaction mixture was effected as in Example I.

If 21 parts of sodium sand or massive sodium are employed in place of the 21 parts of finely dispersed sodium in the process of Example I, utilizing a mixture of 38 parts of n-dodecyl trichlorosilane and 100 parts of p-bromophenyl phenyl ether at the same temperatures of addition, longer reaction times are necessitated and much lower yields of the product tris-(p-phenoxyphenyl)-n-dodecylsilane are obtained.

In the foregoing description of the reactants and products of this invention, the radical R is a cyclomatic radical containing 5 to 14 nuclear atoms, and particularly, a carbocyclic or heterocyclic radical containing at least 4 carbon atoms. When R is heterocyclic, the hetero atom is a chalkogen, that is oxygen or sulfur. Furthermore, R can be substituted with hydrocarbon radicals containing between about 1 to 4 carbon atoms, or aromatic radicals containing 6 to 30 carbon atoms, said radicals directly attached to the cyclomatic radical, or attached thereon through oxygen, sulfur or nitrogen, and free from functional groups reactive with the alkali metal. Furthermore, in the foregoing formulas, $R'_n$ is an organic radical which, when $n$ is greater than 1, represents the same or a plurality of organic radicals containing between about 4 to 20 atoms. More specifically, $R'_n$ can be aliphatic such as alkyl radicals containing between about 5 to 20 carbon atoms, free from groups reactive with the alkali metal, or alkylene radicals containing between about 4 to 7 carbon atoms free from groups reactive with the alkali metal. In addition, the radical $R'_n$ can be a cyclomatic radical such as the radical R defined above.

In the formula RX, defined hereinbefore, the monovalent cyclomatic radical R can be illustrated by phenyl, p-tert-butylphenyl, 2-biphenylyl, 3-biphenylyl, 4-biphenylyl, 4'-o-terphenylyl, 4-m-terphenlyl, 2-p-terphenylyl, 1-naphthyl, 2-naphthyl, 1-anthryl, 2-anthryl, 9-anthryl, 1-phenanthryl, 2-phenanthryl, 3-phenanthryl, 4-phenanthryl, 9-phenanthryl, 2-furyl, 3-furyl, 2-thienyl, 3-thienyl, 2-benzofuryl, 3-benzofuryl, 2-benzothienyl, 3-benzothienyl, o-phenoxyphenyl, m-phenoxyphenyl, p-phenoxyphenyl, o-phenylthiophenyl, m-phenylthiophenyl, p-phenylthiophenyl, o-methoxyphenyl, p-methoxphenyl, o-methylthiophenyl, m-methylthiophenyl, p-methylthiophenyl, o-dimethylaminophenyl, m-dimethylaminophenyl, p-dimethylaminophenyl, 4'-(4-biphenylyloxy)-4-biphenylyl, 4'-(4-biphenylyloxy)-2-biphenylyl, or 4'-(4-biphenylyloxy)-3-biphenylyl radicals and the like.

Compounds of the type $R'_n SiX'_{(4-n)}$, employed in the process of this invention, as defined hereinbefore, are further exemplified by the formula $$R_a R_b R_c SiX_{4-(a+b+c)}$$

wherein $a$, $b$ and $c$ are the integers 0, 1, 2 or 3 and the quantity $(a+b+c)$ is an integer of 1 through 3 inclusive. Thus, the radicals $R_a$, $R_b$ and $R_c$ further depict the radical $R'_n$ and are the same or different organic radicals which can be chosen from those cyclomatic radicals exemplified above, or from alkyl radicals con-taining between about 5 to 20 carbon atoms and alkylene radicals containing between about 4 to 7 carbon atoms, as defined heretofore. Illustrative examples include: n-dodecyl, n-octadecyl, n-hexadecyl, isoamyl, n-decyl, 2,4,6-trimethylnonyl, triisobutyl, 2-methyldecyl, tetramethylene, pentamethylene, hexamethylene, 2-methylcyclobutylene, and the like.

Compounds of the type $R'_n SiR_{(4-n)}$ produced by the process of this invention and defined hereinbefore can be further exemplified by the formula $$R_a R_b R_c SiR_{4-(a+b+c)}$$
wherein $a$, $b$ and $c$ are the integers 0, 1, 2 or 3 and the quantity $(a+b+c)$ is an integer of 1 through 3. The radicals R, $R_a$, $R_b$ and $R_c$ are the same or different organic radicals, as defined hereinbefore. Examples of such tetraorgano monosilane compounds include: tris-(p-phenoxyphenyl)-n-dodecylsilane, tetraphenylsilane, p-tert-butylphenyltriphenylsilane, triphenyl - 2 - biphenylylsilane, phenyl - n - octyl-2-biphenylyl-o-tert-butylphenylsilane, tris-(2-biphenylyl)-phenylsilane, bis-(2-biphenylyl)diphenylsilane, tetrakis(3-biphenylyl)silane, bis-(4-p-terphenylyl)-bis-(4'-o-terphenylyl)silane, tris(1 - naphthyl)-3-biphenylylsilane, tris(9-anthryl)-2-p-terphenylylsilane, 3-phenanthryl-tris-(4'-o-terphenylyl)silane, tris-(9-phenanthryl)-2-naphthylsilane, bis(2-furyl) - bis - (3-phenanthryl)silane, tris(3-biphenylyl) - 3 - thienylsilane, tris-(2-benzofuryl)-3-benzofurylsilane, bis(3-benzofuryl)diphenylsilane, tris(2-phenanthryl)-3-benzothienylsilane, tris(1-naphthyl) - 2 - phenylthiophenylsilane, tetrakis(o-methoxyphenyl)silane, o - methylthiophenyl-tris(2'-p-terphenylyl)silane, bis(4-methylthio-2-furyl)bis(3-benzothienyl)silane, tris(o-dimethylaminophenyl) - 2 - thienylsilane, bis[4'-(4-biphenylyloxy)-4-biphenylyl]bis(m - dimethylaminophenyl)silane, phenyl-tri - (n - amyl)silane, triphenyl-n-dodecylsilane, bis(1-naphthyl) - di - (n-octadecyl)silane, 3-benzothienyl-tri-(n-hexadecyl)silane, bis-(4-methylthio-2-furyl)diisoamyl silane, bis-[4'-(4-biphenylyloxy)-3-biphenylyl]di-n-decylsilane, 1-thienyl-tris(1, 3,5,7-tetramethyloctyl)silane, tris(o-phenoxyphenyl)-2-methyldecylsilane, bis(9-phenanthryl)-bis(2-methyldecyl) silane, 1,1-bis(4'-o-terphenylyl)cyclosilabutane, 1,1-diphenylcyclosilahexane, 1,1 - bis(p-phenoxyphenyl)cyclosilaheptane, and the like.

The following examples further illustrate that these wide variations of types and combinations of tetraorgano monosilane compounds are prepared in an economical and simple fashion and in high yield by the process of this invention.

*Example II*

A reaction vessel is equipped with means for agitation, heating, continuous addition of reactants and refluxing. To it is added 13.8 parts of sodium as a 20% dispersion in equal parts of cyclohexane and 2,2,5-trimethylhexane employing as a dispersing agent 1% of dilinoleic acid based upon the weight of sodium. The particle size of the sodium in the dispersion ranges from 5 to 15 microns. A continuous stream of nitrogen is swept through the system. While agitating this dispersion at a temperature of 30 to 40° C., a mixture of 62.9 parts of p-methylthiobromobenzene and 26.8 parts of 2-benzothienyl trichlorosilane is added over a period of about one hour. Following about a one hour standing period, the reaction mixture is heated at its atmospheric reflux temperature for a period of 5 hours. The temperature of the reaction mixture is reduced to about 25° C. and diluted with 48 parts of methanol followed by sufficient addition of dilute hydrochloric acid to acidify the mixture. The reaction product is then filtered through a layer of diatomaceous earth whereupon the filtrate separates into two layers. The organic layer containing the product is treated with water until the water extracts are neutral. The organic layer is separated by decantation, dried and the solvent removed by distillation. The residue containing the product is fractionally distilled under vacuum. Tris(p- methylthiophenyl)-2-benzothienylsilane is obtained in high yield and purity.

*Example III*

The process of Example II is followed utilizing a mixture of 45.2 parts of 2-chlorobiphenyl and 50.5 parts of di-(n-octadecyl)dichlorosilane and 10.6 parts of sodium as a 20% dispersion in decalin. The product bis(2-biphenylyl)-di-(n-octadecyl)silane is obtained in satisfactory yields.

*Example IV*

The process of Example II is repeated except that 21 parts of sodium as a 20% dispersion in equal parts of 2,2,5-trimethylhexane and benzene is added to a mixture of 100 parts of p-bromophenyl phenyl ether and 38 parts of n-dodecyltrichlorosilane, said mixture being diluted in benzene. In this manner satisfactory yields of tris-(p-phenoxyphenyl)-n-dodecylsilane are obtained.

*Example V*

A mixture of 123.8 parts of chlorobenzene, 207.5 parts of 4-chlorobiphenyl, 186.7 parts of p-tert-butylchlorobenzene, and 248 parts of n-octyltrichlorosilane is added in a process similar to Example II to 158.7 parts of sodium as a 20% dispersion in benzene and 2,2,5-trimethylhexane. Tris-(p-tert-butylphenyl)-n-octylsilane, bis(p-tert-butylphenyl)phenyl-n-octylsilane, diphenyl-(p-tert-butylphenyl)-n-octylsilane, triphenyl-n-octylsilane, (p-tert-butylphenyl)phenyl-4-biphenylyl-n-octylsilane, bis(p-tert-butylphenyl)-4-biphenylyl-n-octylsilane, diphenyl-4-biphenylyl-n-octylsilane, tris(4-biphenylyl)-n-octylsilane, bis(4-biphenylyl)-p-tert-butylphenyl-n-octylsilane, and bis(4-biphenylyl)phenyl-n-octylsilane are obtained in yields founded on a statistical distribution based on the relative rates of reactivity. For some applications it is desirable to employ the product mixture without separating the products by fractional distillation.

The temperatures employed should be sufficiently low to discourage undesirable side reactions such as a Wurtz-type coupling producing carbon-to-carbon and silicon-to-silicon bonding or cleavage of carbon-to-oxygen and carbon-to-sulfur bonds, when reactants containing these substituent groups are present. The choice of temperature in this range, therefore, depends on the relative reactivities of the reactants. Thus, addition of the reactants is carried out at temperatures from between about 0 to 200° C. However, it is preferred to conduct the addition in a range of between about 20 to 120° C. Upon completion of this addition a heating period, which may employ temperatures of between about 50 to 200° C., and, preferably, within a range of 60 to 120° C., sometimes is employed to insure complete reaction.

The following is an example of a low temperature reaction.

*Example VI*

A process similar to Example II is followed with the following exceptions. A mixture of 53.4 parts of iodonaphthalene and 33.8 parts of 1,1-diiodo cyclosilapentane is added to 18 parts of potassium in a 20% dispersion in benzene, employing 1% stearic acid, based on the weight of potassium as a dispersing agent while the mixture is added at a temperature of 10 to 20° C. In this manner, good yields of dinaphthyl cyclosilapentane are obtained.

The following example illustrates a high temperature reaction and, additionally, demonstrates that the mode of addition is not critical and, in some cases, can be varied in the process of this invention.

*Example VII*

In this case, the process of Example II is followed. However, 36.0 parts of the compound 1-chloronaphthalene is added to 10.6 parts of sodium as a 20% dispersion in decalin, while the temperature of the reaction is maintained below 40° C. Following this addition, 29.7 parts of the compound di-n-hexadecyl dichlorosilane is added to the reaction mixture at a temperature between about 80 to 100° C. Upon completion of this addition the reaction mixture is refluxed at the atmospheric boiling point of between about 185.5 to 194.6° C. In this manner good yields of bis(1-naphthyl)-di-n-hexadecylsilane are obtained.

It is well known that there is a large steric factor present to hinder the attachment of a third and fourth aromatic radical to the silicon atom in the case of large bulky aromatic radicals such as, 2-biphenylyl, m-terphenylyl, 1-naphthyl, 1-phenanthryl, 4'(4-biphenylyloxy)-4-biphenylyl, and others named hereinbefore. However, satisfactory yields of these compounds can be obtained by the process of this invention. Examples of the preparation of such tetraorgano monosilanes containing bulky aromatic radicals by the process of this invention follow.

*Example VIII*

The process of Example I was followed, however, in this case a mixture of 48.5 parts of n-octadecyl trichlorosilane and 95.5 parts of 2-bromodiphenyl was added to 21 parts of sodium as a 20% dispersion in isooctane and the mixture maintained at 95° C. for one hour to yield 31% of tris-(2-biphenylyl)-n-octadecylsilane having a refractive index $n_D^{25}$ 1.5677 and distilling at a temperature of 220 to 305° C. at about 0.3 mm. mercury.

*Example IX*

When employing a mixture of 35.4 parts of o-tert-butylchlorobenzene and 42.8 parts of bis(dimethylaminophenyl)-dibromosilane and 10.6 parts of sodium as a 20% dispersion in equal parts of 2,2,5-trimethylhexane and benzene, in the process of Example III, the product bis(o-tert-butylphenyl)bis(dimethylaminophenyl)silane is obtained in good yields.

The purity of the alkali metal employed in this dispersion is not critical. It can be an inexpensive industrial grade and, for this reason, it is preferred to use sodium which is commercially available. Any alkali metal above atomic weight of 7 can be used.

The following example uses potassium as a condensation agent.

*Example X*

A mixture of 21.3 parts of iodofuran, 27.8 parts of triphenylfluorosilane and 9.8 parts of potassium as a 20% dispersion in butylcyclohexane, employing carbon black as a dispersant, at a temperature of 0 to 10° C. during the addition of the mixture, is employed in the process of Example I. The product triphenylfurylsilane is obtained in high yield.

The process of this invention is not limited to the exclusive employment of sodium or potassium as a condensation agent. For example, in the reaction

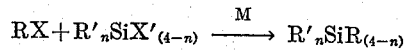

$$RX + R'_nSiX'_{(4-n)} \xrightarrow{M} R'_nSiR_{(4-n)}$$

M can be any alkali metal above the atomic weight of 7—that is, sodium, potassium, rubidium, cesium or francium.

The alkali metal employed should have a particle size not greater than 100 microns. Generally, the metal has an average particle size below about 25 microns. Good reaction times and yields have been obtained in the range between about 5 to 15 microns.

It has been found that the process of this invention can be conducted in an inert medium—that is, one which does not coordinate with the reactants. Thus, in particular, organosilanes and hydrocarbons represent preferred media for this process. When the inert medium is a tetraorgano monosilane such as those produced in the process of this invention, there can be employed, for example, tetrabutylsilane, diphenyl-di-(n-undecyl)-silane, tris-(2-biphenylyl)n-octadecylsilane and the like. It is especially preferred, however, to employ as the inert medium a hydrocarbon containing between about 5 and 20 carbon atoms, and free of hydrogen atoms of sufficient reactivity to react with the intermediate organosodium compound. The boiling point of the hydrocarbon medium utilized in such an embodiment of the process of this invention is between about 0 to 200° C., preferably, between about 0 to 120° C. The hydrocarbon medium can be aromatic, aliphatic or alicyclic, such as, for example n-pentane, isopentane, neopentane, cyclopentane, butylcyclohexane, 2,2,5-trimethylhexane, n-decane, 2,2-dimethyloctane, 9-n-propylheptadecane, 5,8-di-n-butyldodecane, 1-cyclohexyl-2-(3-cyclohexylcyclohexyl)ethane, benzene, decalin and the like.

To further illustrate that the inert medium, in some instances, is not a hydrocarbon, the following example is included.

*Example XI*

The process of Example VIII is followed with the exception that, in this case, the product tris-(2-biphenylyl)-n-octadecylsilane, derived from a previous run is utilized as the dispersing medium and a heating period at approximately 95° C. is substituted for the atmospheric reflux temperature.

In order to provide the alkali metal in a form suitable for the process of this invention a small quantity of dispersing agent, such as, for example, decanoic acid, hendecanoic acid, lauric acid, myristic acid, palmitic acid, linoleic acid, dilinoleic acid, margaric acid, stearic acid, arachidic acid, cerotic acid, melissic acid, oleic acid, and erucic acid, carbon black, 18.4% smoked rubber sheet in xylene, refined fish oil and the like, is employed during preparation of the alkali metal dispersion in quantities from between about 0.01% to 2% by weight of the alkali metal.

The various components of the reaction mixture can be separated from the final product by several methods. The inorganic by-products of the reaction are normally separated by aqueous extraction employing techniques such as hydrolysis, acidification, filtration, decantation, neutralization and the like. The hydrolysis step is the most critical and in some instances, particularly when the silicon to carbon bond of the tetraorgano monosilane product is unusually susceptible to cleavage, it is preferred to add an amount of alcohol equivalent to the alkali metal remaining in the reaction mixture, followed by slow addition of dilute hydrochloric acid while stirring and maintaining the temperature below about 50° C. Various methods can be employed to separate the final product from the hydrocarbon medium. When a high boiling product is produced in a low boiling medium the reaction is conducted under sufficient pressure to obtain the preferred reaction temperature. This permits the separation to be conducted under atmospheric pressure by distilling off the low boiling medium and retaining the high boiling product. Another suitable method, particularly useful when a low boiling product is formed, is to employ a high boiling medium under atmospheric pressure to effect the reaction and then separate the product by overhead distillation. The product is normally separated from the reaction mixture by distillation after the hydrocarbon medium has been removed. If the product has a high atmospheric boiling point the distillation can be carried out under vacuum, thereby sufficiently lowering distillation temperature so as to avoid decomposition of the product in the distillation column. Other methods, such as extraction techniques and the like, can in some cases be used to separate the product from the reaction mixture. Also any excess alkali metal can be destroyed by such methods as, for example, the addition of equimolar proportions of water and isopropanol at the end of a run.

Enough inert hydrocarbon or silane medium should be used so that a fluid system is maintained throughout the reaction. To assure this condition additional medium can be added at any time during the reaction. The concentrations usually employed are between about 5 to 60% by weight of the alkali metal used in the reaction. It is necessary to employ sufficient agitation to insure contact of the reagents in the heterogeneous reaction system. At temperature above the melting point of the alkali metal, it is not necessary to increase agitation over that employed below the melting point to prevent agglomeration of the alkali metal, as the dispersing agent prevents any such occurrence.

Ordinarily, the reaction should be conducted in an inert atmosphere to exclude oxygen moisture, carbon dioxide, and other materials reactive with the alkali metal dispersion. The reaction, preferably, is carried out employing dry nitrogen or other inert gas.

In batch operation the total reaction time can be one-half hour to 48 hours. However, a half hour to 8 hours is preferred. The process can be conducted either in a batch or continuous manner. When carried out continuously, it is preferred to employ a tube-type reactor. In the latter case, the organo halide and the organo halosilane mixture and the alkali metal dispersion is fed continuously in the desired proportions to the inlet end of the tube-type reactor.

Compounds produced in the process of this invention are, in most cases, fluids of varying viscosities, but which maintain their fluidity over wide temperature ranges, including abnormally high or low temperatures. In addition, these compounds are relatively chemically inert. Furthermore, these compounds exhibit high temperature stability, excellent lubricating properties, high electrical resistance and are stable to oxidation. Because of these properties, it is feasible to employ these compounds as low to high temperature lubricants, low to high temperature hydraulic fluids, dielectrics and inert liquids.

The compounds produced by the process of this invention have both low vapor pressure and wide liquid temperature range. In addition, they have a low viscosity index and good lubricity properties. These properties combined with high thermal stability and resistance to both chemical and oxidative attack make them ideally suited for lubricant applications where conventional materials such as hydrocarbon lubricants are not satisfactory. A typical example of such a use of the compounds of this invention is lubrication of moving parts of modern aircraft engines, in particular those of the jet type wherein high engine temperatures are encountered in operation, but at the same time the materials are alternately subjected during flight conditions to extremely low temperatures and pressures at high altitudes.

To illustrate the effectiveness of these materials for such applications, tris-(p-phenoxyphenyl)n-dodecylsilane when employed in substantially pure form as a primary lubricant in the main bearing of the gas turbine of a high performance jet engine under flight conditions, provides good lubrication under all conditions encountered. Thus, inspection of the moving parts before and after operation indicates substantially no bearing corrosion, pitting or wear. Other tetraorgano monosilanes produced by the process of this invention are equally effective providing this protection under these conditions. Thus, similar results are obtained when tris(4-biphenylyl)-n-octadecylsilane, tetraphenylsilane, tetrakis(4'-o-terphenylyl)silane, triphenyl-p-tert-butylphenylsilane, phenyltri-n-amylsilane, bis(1-naphthyl)di-n-octadecylsilane, tri(o-phenoxyphenyl)triisobutylsilane, 1,1-bis(4-m-terphenylyl)cyclosilabutane, bis(1-naphthyl)diphenylsilane, tris(2-benzofuryl)(3-benzofuryl)silane are employed.

Further applications of the compounds produced by the process of this invention are as follows. When used as lubricants and hydraulic fluids, these compounds are extremely useful in applications where wide ranges of abnormally low to abnormally high temperatures are encountered such as, jet aircraft engines, high temperature conveyors, switch gears, bomb-bay rack mechanisms, gyrobearings, fan motors operating at high temperatures, motors in aircraft and on shipboard, control valves, automobile window channels, instruments and gauges subjected to extreme temperature conditions, pressure lubricated valves and flow meter bearings operating at high or low temperatures with a wide variety of corrosive chemicals, and the like. When employed as dielectrics, these compounds are especially useful in such applications as electric motors exposed to overloads, to high ambient temperatures or to excessive moisture or corrosive atmospheres such as, motor driven centrifugal wheels, condensate pumps, cranes and conveyors, fans and blowers, mixing machines, and the like. Also, equipment exposed to high humidity, geophysical equipment, and oil well instruments, aircraft automotive ignition systems, electronic equipment, aircraft fuel transmitter head gauges, and the like. Furthermore, these compounds may be employed in such applications as high temperature baths where maximum stability and life are required, high vacuum diffusion pump fluids, as damping media, such as, dash pot fluids for electrical instruments and switches, gauges, phonograph pick-ups, amplifiers, solenoids, circuit breakers, gyroscopes, accelerometers, aircraft motor cooling fins, draft injectors, scales and balances, galvanometers, geophones, and the like. Additionally, these compounds may be used as inert liquids in such applications as heat transfer media where the high temperature properties these compounds exhibit are necessary.

Having thus described the process of the present invention, it is not intended that it be limited except as specified in the following claims.

I claim:
1. A process for the preparation of tetraorgano monosilanes which comprises condensing a compound RX wherein R is an aryloxy phenyl group and X is a halogen, with a compound $R'_nSiX'_{(4-n)}$ wherein R' is an aliphatic group free from groups reactive with sodium containing between about 5 to 20 carbon atoms, X' is a halogen, and $n$ is an integer from 1 to 3 inclusive, by means of finely dispersed sodium having a particle size not greater than 25 microns, said sodium finely dispersed in a hydrocarbon medium having a boiling point between about 0 to 200° C., said condensation being conducted at a temperature between 30 to 40° C.

2. The process of claim 1 wherein the compound RX is p-bromo phenyl phenyl ether and the compound $R'_nSiX'_{(4-n)}$ is n-dodecyl trichlorosilane, the condensation is carried out at a temperature between 30 to 40° C., the hydrocarbon medium has a boiling point of between about 20 to 120° C., and the organo reactants are added to the sodium dispersion.

References Cited in the file of this patent
UNITED STATES PATENTS

| | | |
|---|---|---|
| 2,238,669 | Wiley | Apr. 15, 1941 |
| 2,386,452 | Fleming | Oct. 8, 1945 |
| 2,572,402 | Speier | Oct. 23, 1951 |
| 2,611,779 | Speier | Sept. 23, 1952 |
| 2,716,662 | Cohen | Aug. 30, 1955 |

FOREIGN PATENTS

| | | |
|---|---|---|
| 137,331 | Australia | May 22, 1950 |

OTHER REFERENCES

Hansley: "Ind. and Eng. Chem.," vol. 43, No. 8 (Aug. 1951), pp. 1759–66.

Emblem et al.: "Chemistry and Industry," vol. 29 (July 1955), pp. 905–6.